United States Patent Office 3,010,831
Patented Nov. 28, 1961

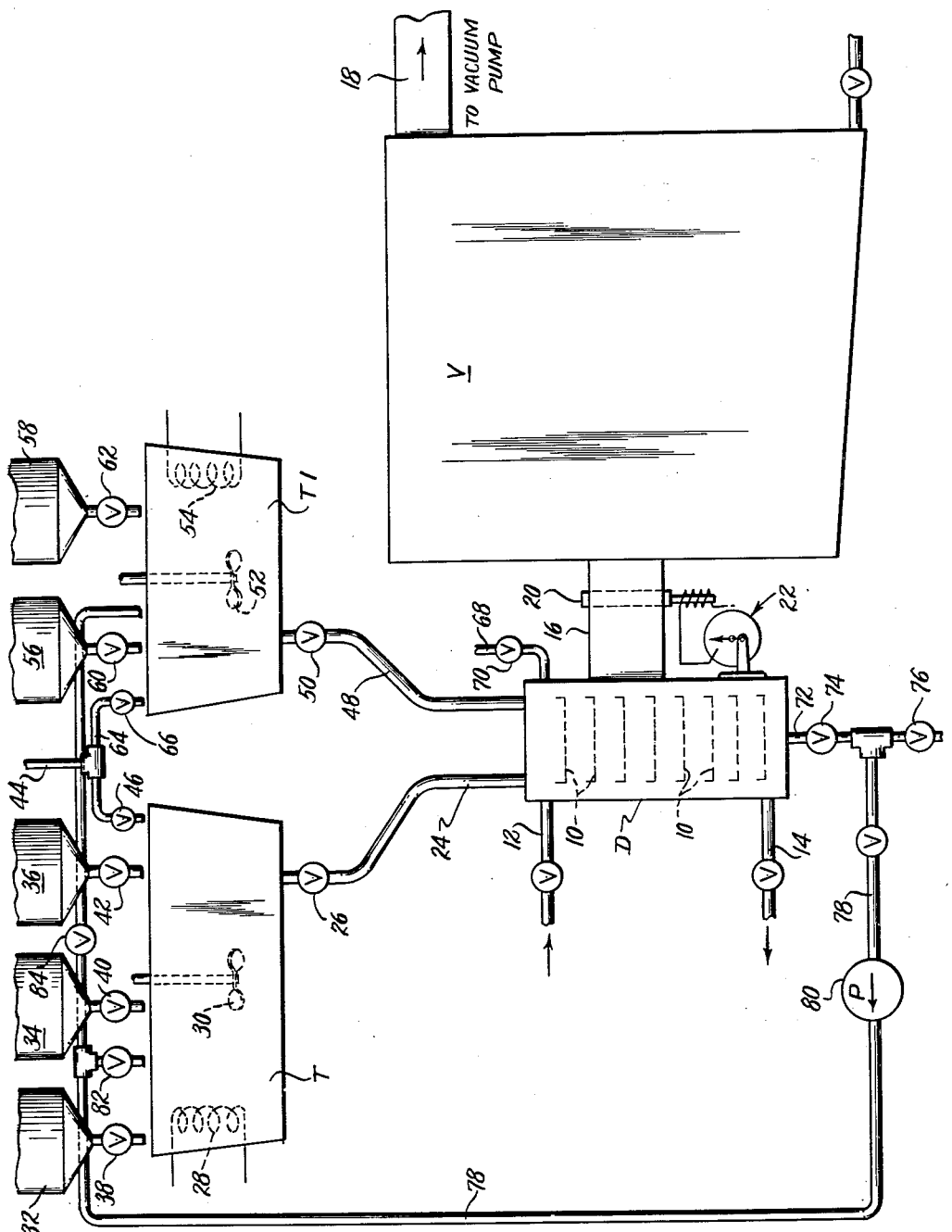

3,010,831
PROCESS FOR TREATING FOOD PRODUCTS
Eugene J. Rivoche, 1629 Columbia Road NW., Washington, D.C., assignor, by mesne assignments, to Rivark Research and Development Corporation, a corporation of Indiana
Filed Jan. 27, 1959, Ser. No. 789,362
6 Claims. (Cl. 99—193)

This invention relates to a process for the treatment of food products and more particularly to improvements in the process of preserving food products by a combination of dehydrating and impregnating steps, whereby food products retain substantially their initial shape and appearance after freezing and thawing, or cooking.

The process is useful in connection with the treatment of various kinds of food products including vegetables, meats and fish, but is especially useful in the treatment of fruits and berries, for example, peaches, apricots, plums, cherries, apples, strawberries, blackberries, raspberries, gooseberries, etc.

It has heretofore been proposed to improve and preserve fruits by partial dehydration followed by immersion of the partially dehydrated products in a solution of an edible liquid, such as sugar or the like, so that the liquid is absorbed by the fruit, followed by a freezing step. While this process has been generally useful, there are still a great many features requiring improvement. Thus, the impregnation time is undesirably slow and difficulty is involved in obtaining solutions of desirably high concentration within the food product. This is particularly true when the solution to be absorbed is of a viscous nature. It has also been found that the previously proposed solutions do not adequately preserve the shape and appearance of the food product treated when such product is thawed. For example, berries, such as strawberries and the like, have a tendency to become mushy when thawed or cooked after preservation by freezing. Further, in the old process, osmosis occurs, which results in natural sugars and flavors being lost from fruit into fluid in which it is immersed, and these substances are lost if the fruit is drawn off.

The present invention has for its primary object the overcoming of the aforementioned problems.

Another object of the invention is to provide a rapid method for impregnating food products with a liquid of sufficient viscosity, concentration, or gel-forming characteristics to prevent loss of shape or appearance of the food product after freezing, thawing, or cooking.

In accordance with one aspect of the invention, the edible liquid with which the food product is to be impregnated is quickly incorporated within the food product by a rapid series of vacuum dehydration steps, followed by or partially alternated with impregnation operations. A plurality of impregnation steps between dehydration cycles enables the concentration of solute to be built up within the product and different solutions may be incorporated at different stages, if desired. In accordance with another aspect, the partially dehydrated food products are impregnated with a solution or solutions of gel-forming ingredients. This operation may be conducted, if desired, under conditions which produce a gel capable of withstanding freezing, thawing, and cooking action. In all operations the impregnation is rapidly accomplished by reason of vacuum conditions existing within the partially dehydrated food product.

In my prior Patent No. 2,709,857, I have disclosed a process for dehydrating moisture-containing food products wherein such food products are heated throughout and alternately subjected to suddent drops of pressure and further heating. By this method, the heat which brings about the evaporation and removal of moisture from the food product, is effective from the inside of the product outwardly, so that there is no undue heating of the surface portion of the food product such as would result in the formation of a hard surface crust. Consequently, dehydration of the food product is substantially uniform throughout, numerous small fissures and capillaries are formed in the skin and interior of the product, and the resultant product is one which is readily reconstitutable by the absorption of water, to give a reconstituted product which compares most favorably with the original product in appearance, taste, flavor, etc. In carrying out such process, the food product to be dehydrated is placed in a suitable vacuum drying chamber and heated to a predetermined temperature, preferably in the range of about 80° to 150° F. Higher temperatures may be used in some instances, but should never be high enough to carbonize or otherwise deleteriously affect the food product. When the food product has been heated to the desired extent, the pressure to which it is subjected is suddenly reduced to a point at which the temperature of the moisture content of the food product is within its boiling point at the reduced pressure, so that a portion of the moisture content will flash into steam and escape from the food product.

After the food product has been subjected to the reduced pressure for a period of from about 5 to 20 seconds, and preferably from 10 to 12 seconds, which period will generally be sufficient to bring about the removal of the desired degree of moisture from the food product at that time, and to result in the lowering of the temperature of the moisture content remaining in the food product to that corresponding to its boiling point at the reduced pressure, due to the cooling effect of the evaporation of the moisture therefrom, communication with the source of vacuum is shut off and the food product is again heated to the predetermined degree. Such heating results in an increase in pressure in the closed dehydrating chamber due to a gradual evaporation of some of the moisture content in the food product due to the pressure still existing in the dehydrating chamber, and the heating of the food product again restores it to a predetermined temperature prior to a subsequent drop of the pressure in the dehydrating chamber, which predetermined temperature may correspond to the boiling point or slightly above of the moisture of the food product at the increase (but still negative) pressure in the dehydrating chamber. The pressure to which the food product is subjected is again lowered to bring about the flash generation of more of the moisture content of the food product into steam and its escape from the food product. This cycle of operations is continued until the food product is dehydrated to the desired extent. The number of cycles which will be required to bring about the desired dehydration will depend upon the moisture content of the food product, the temperature to which it is heated, the extent to which the pressure thereon is reduced during each cycle of operation, and the size of the particles of the food product. As only a small portion of the moisture of the food product is removed during any one cycle of operation, it may be necessary to subject the food product to several hundred or even a thousand or more cycles to bring about the desired degree of dehydration. Cyclic vacuum dehydration in this manner provides a multitude of small fissures or capillaries in the skin and other parts of the food product which greatly facilitate further evaporation or impregnation.

In accordance with the first aspect of the present invention, the food products are partially dehydrated by subjecting them to a series of subatmospheric pressure changes at an elevated temperature in the manner described above, and following such changes or between at least some of said pressure changes, the partially dehydrated products are caused to absorb a solution of an edible liquid with which it is desired to impregnate same prior to using, freezing or storing. This absorption step can be repeated a plurality of times between the dehydration steps in order to build up the concentration of the solute in the liquid remaining within the food products. Thus, the partially dehydrated food product, after having been subjected to a series of subatmospheric pressure changes, may be immersed while subatmospheric conditions still exist within the product of a liquid containing, for example, any desired percentage of a solute such as sugar, salt, a hydrophilic colloid, flavoring ingredients, antioxidants, minerals, vitamins, or any combination thereof. After a suitable absorption period (almost instantaneous), the solution may be drawn off and the impregnated products may be used immediately, canned, frozen, or otherwise preserved or stored, or may again be subjected to a series of subatmospheric pressures at elevated temperature, whereby moisture is again driven off, leaving the solute of the impregnating solution within the food product. The impregnating solution which was drawn off may be readjusted as to solute content and again used to further impregnate the partially dehydrated, partially impregnated material. This cycle of operations can be repeated until a desirable concentration of solute has been built up in the food product. Thus, for example, whereas the impregnating solution originally contained one percent of solute, the liquid remaining within the food product may have a concentration of five percent or more. The absorption step can be conducted so rapidly that the sugars and other soluble constituents within the food product are not lost to the surrounding fluid in which it is immersed. There is no need to retain the product in the impregnating fluid for such time as to approach solution equilibrium conditions in the fluid within and without the product.

Following this operation, the impregnated food products may be immediately subjected to a freezing step in the usual manner either in the impregnating solution or in a separate solution, and due to the concentrated solution therein, readily maintain their original shape and appearance.

It is desirable that the impregnant contain a hydrophilic colloid which during the impregnating operation will provide a relatively viscous or gelled solution within the food product, thereby rendering it more readily capable of preserving its shape. Such colloids as methyl cellulose, hydroxymethyl cellulose, alginates, pectins, as well as the various other synthetic and natural vegetable gums, may be utilized in the operation. All alginates and pectins will harden or gel by reason of acids of sufficient concentration. Thus, fruits may be impregnated with solution which will harden or form gels under influence of the acid occurring naturally in the fruit.

Methyl cellulose is the preferred colloid for food products which are eventually to be cooked after freezing. This colloid preserves its gel-forming characteristics after freezing and thawing, and is capable of gel formation during a subsequent cooking operation to thereby improve the texture and shape of the cooked products. Moreover, methyl cellulose solutions are most fluid at temperatures of about 70 to 100° F., which is a very desirable temperature for conducting cyclic impregnation. Warm fluid methyl cellulose solution can be used as heating medium in the cyclic process instead of heating coils. Generally, the heating is much faster through the use of hot liquid than through other media and provides a better guarantee of formation of hard crusts on the product. By this means, the warm impregnation liquid is kept in the impregnation chamber until the product is reheated prior to the next cyclic operation. Thus, heating for the next cycle occurs when the impregnation with the warm liquid takes place. Methyl cellulose may be used either alone or in combination with ingredients which gel in situ within the food under other conditions.

In accordance with the second aspect of the invention, the partially dehydrated food products, which have preferably been subjected to the plurality of subatmospheric pressure changes, so as to be in condition for ready absorption of an impregnating liquid, are immersed in a gel-forming solution or solutions which form a gel in situ within the product. The gel, either by reason of inherent characteristics or by reason of the conditions under which the gel is formed, may be capable of resisting freezing and thawing. Thus, the gel-forming solution may be a solution of a water-soluble alginate and a very slowly soluble alkaline earth metal salt, or a combination of edible acids, buffer salts and alkaline earth metal salts capable of slowly releasing alkaline earth metal ions so as to form a cold-water alginate gel in a time period of from five minutes to one-half hour, as disclosed in my prior patent, Number 2,791,508. Where fruits and berries are treated, usually no acid is needed as fruit contains enough for gelation. Acid may be used where food contains insufficient acid. Thus, an alginate solution plus a calcium salt, such as calcium carbonate, di- or tricalcium phosphate, may be used, so that gelling action occurs due to acidity of fruit acids when solution goes into the fruit. If such a solution is prepared at substantially freezing temperatures, i.e., between about 0° and 4° C., and the subsequent impregnation and gel-forming operations are also carried out at such temperatures, the product can then be frozen and the impregnating liquid will remain in gel form even after the frozen material is thawed. In accordance with this operation, the cold-water, gel-forming ingredients are first dissolved in water at substantially freezing temperatures, and the partially dehydrated food product is immersed at substantially freezing temperatures after which, when absorption is completed to the degree desired, the food materials are removed, permitted to set at just above freezing temperature, 0° to 4° C., until gel formation has been completed within the food particles, whereupon the whole mass is subjected to freezing at the temperature necessary for preservation.

Of importance in the process is my so-called autocoagulation operation wherein delayed gel-forming action is realized by using cream of tartar (potassium bitartrate) as the acid ingredient of an alginate-insoluble calcium salt impregnating solution. This acid solubilizes more rapidly and to a much greater extent at boiling temperature than at room temperature, and thereby acts to release more calcium at higher temperatures. When fruit is impregnated with a delayed-action solution and when pies or the like containing such fruit are cooked, a relatively hard gel is formed. This has the advantage that solutions can be made up in cold and held for hours; other solutions, if held, might set to gel before impregnating. Also, cooking does not undesirably soften the product fruits.

The invention will be bettter understood by reference to the accompanying drawing, in which the sole figure diagrammatically illustrates apparatus suitable for carrying out the various process features previously described. Referring now to the drawing, the food product to be dehydrated is placed in a dehydrating chamber D, preferably by placing it in trays 10, the chamber being heated by steam coils, electric heaters or otherwise, if desired. Preferably, the dehydrating chamber D is provided with coils through which a heat-exchange medium may be circulated, entering, for example, at inlet 12 and leaving at outlet 14. This heat-exchange medium may be steam or, in some instances, may be a suitable refrigerant or the impregnating liquid itself. In some of the operations described herein, it is contemplated that the heat-exchange medium may first be steam, followed by a refrigerant, the inlet 12 and outlet 14 being connected by suitable valving and conduit arrangements (not shown) to sources of these fluids. Thus, for example, in dehydrating operations, steam may be utilized to heat the dehydrating chamber, following which the food product and impregnating solution within such chamber is maintained between 0° and 4° C. by circulating a refrigerant through the heat-exchange means. This enables a gel-forming solution to be introduced within the dehydrated product at a temperature at which the resulting gel will withstand freezing and thawing.

The dehydrating chamber D is in communication with a vacuum chamber V by means of a suitable passageway 16. A conduit 18 extends from the vacuum chamber V to a vacuum pump which will maintain a high degree of vacuum, for example, 30 to 32 inches of mercury in the vacuum chamber. The passageway 16, connecting the dehydrating and vacuum chambers, normally is closed by an automatically operated valve 20 controlled by pressure and time-controlled mechanism 22 in a manner more fully described in my prior Patent 2,709,857. In operation, the vacuum chamber V and its time- and temperature-controlled valve 20 automatically provide a rapid series of flash evaporating operations.

A tank T for impregnating solution is superimposed above dehydrating chamber D and is in communication with the top thereof by means of a conduit 24, having valve 26 therein. Tank T is provided with a heat-exchange means 28 through which either heating fluid, such as steam, or a refrigerant, may be circulated as desired. An agitator 30 is provided for maintaining any solid particles in homogeneous dispersion in the liquid in the tank T. Hoppers 32, 34 and 36, having valves 38, 40 and 42, are disposed above the tank T so that various ingredients may be introduced into the tank as desired. Conduit 44, having a valve 46, provides an inlet for water or other liquid. An auxiliary tank T1 is likewise superimposed above the chamber D and is in communication therewith by means of conduit 48 having a control valve 50. This tank T1 is likewise provided with an agitator 52 and with heat-exchanger means 54. Hoppers 56 and 58, having valves 60 and 62, are positioned above such tank so that various ingredients can be incorporated therein. Water may be introduced into the tank T1 by means of branch conduit 64 and valve 66. Dehydrating chamber D is further provided with a vent 68, having a valve 70 therein, so that it can be vented to atmospheric pressure when desired. Dehydrating chamber D, further, has a draw-off conduit 72, containing a valve 74, and connected through valve 76 to a suitable sump. A conduit 78, having a pump 80 therein, is connected to the draw-off conduit 72 so that, if desired, liquid drawn off from the dehydrating chamber D may be recirculated through valve 82 to tank T, or through valve 84 to tank T1.

In an illustrative embodiment of the invention, hopper 32 may contain sodium alginate, hopper 34 may contain calcium carbonate, and hopper 36 may contain sugar. Tank T is thereby utilized for preparation of a sodium alginate-calcium carbonate-gel-forming sugar solution. Hopper 56 above tank T1 may contain methyl cellulose solution and tank T1 can be utilized for mixing this solution with sugar, flavoring, or other desired ingredients from hopper 58. In this instance, after a first partial dehydrating operation is conducted on a food product held within the dehydrating chamber D in accordance with the method described in my Patent 2,709,857, the valve 20 is closed by manual or time-operated means and the valve 50 is then opened to permit methyl cellulose solution to fill the dehydrating chamber D. This chamber is rapidly filled by means of the vacuum condition existing therein and, moreover, the food product on the shelves rapidly absorbs impregnating solution, since vacuum conditions still exist within the pores of the food itself. The methyl cellulose solution in tank T1 may be maintained at a temperature within the range of 70° to 90° F. by circulating a heating medium through heat-exchanger means 54.

After a short impregnating period, for example, one to two minutes, valve 50 is closed, valve 70 is opened, connecting vent 68 to the atmosphere, and the liquid in dehydrating chamber D is withdrawn through valve 74 and conduit 78 by means of pump 80 and returned to the tank T1 through valve 84, valve 82 being closed. Valves 70 and 74 are now closed and the timing device 22 is actuated to begin cyclic dehydration operations by periodically connecting vacuum chamber V to the dehydrating chamber D through valve 20. During such operation, heating medium may be circulated through inlet 12 and outlet 14 through the dehydrating chamber. After dehydration, say, to 10 to 20% reduction in moisture content, the valve 20 is again caused to be closed, and valve 26 is now opened to introduce alginate solution into the dehydrating chamber D for impregnation of the product on the shelves 10. Such impregnation can be carried out at any desired temperature below about 120° F. If the product is eventually to be frozen, it is desirable that gel-forming operations be conducted at a temperature between about 0° and 4° C. In this instance, the alginate solution in tank T is chilled by introducing a refrigerant through the heat-exchange means 28 so that the gel-forming ingredients are in the desired temperature range. Refrigerant may also be circulated through the heat-exchange means in dehydrating chamber D through inlet 12 and outlet 14, so as to reduce the temperature of the food product to the desired degree. Thus, the product will be impregnated with gel-forming alginate solution at a temperature within the desired range. It is assumed in this instance that the product is a fruit, and that the natural acid content of such fruit is being used to facilitate the gel formation. It would be possible, of course, to use a further impregnating operation either to provide an edible acid or soluble calcium ions within the food product prior to the incorporation of alginate solution.

After the food product has been immersed for a suitable length of time in the alginate solution, the valve 26 is closed, the valves 70 and 74 are opened, and the solution is withdrawn through conduit 78 by means of pump 80, and recirculated into tank T through valve 82.

It will be understood that the arrangement of apparatus shown in the drawing may be utilized in a great many different ways. For example, a single tank may be utilized to provide sugar solution or sugar-colloid solution, the second tank in this instance being unnecessary. In this embodiment, a single solution is introduced into the product and built up in concentration by alternate dehydration and impregnating cycles as many times as desired.

In a further modification, a sodium alginate solution without calcium salts may be prepared in tank T, and a solution of a soluble calcium salt, such as calcium chloride or calcium lactate solution, may be prepared in auxiliary tank T1. After partial dehydration, the food product is first impregnated with the soluble calcium salt solution from tank T1, subjected to further dehydration, then impregnated with alginate solution from tank T. Additional tanks may be provided if more than two solutions are to be sequentially incorporated into the product.

The invention is further illustrated by the following specific examples of practice:

*Example 1*

For the preparation of strawberries, a batch of fresh, whole strawberries which have been capped and graded are dehydrated by subjecting them at a temperature of about 100° F. to cyclic vacuum operations as described in my prior patent, 2,709,857, until about 10 to 20% of the water has been extracted. The valve between the source of vacuum and the dehydrating chamber is then closed and sufficient sodium alginate-sugar soution is run into the dehydrating chamber to completely immerse the berries. The sodium alginate-sugar solution contains one percent sodium alginate and has dispersed therein a small quantity of a substantially water-insoluble calcium salt, such as 0.12% calcium carbonate, or from about 0.18 to about 0.20% tricalcium phosphate. Any desired quantity of sugar and flavoring may be incorporated in the solution. After immersion for several minutes, the alginate solution is run off for re-use. The natural acid present in the berries acts upon the calcium salt of the impregnating solution retained within the berries and releases calcium ions, thereby forming an alginate gel in situ within the berries. After a suitable gelation and cooling time, which may be from about 5 to about 20 minutes at the temperatures involved, the berries are ready for freezing, canning, or immediate use. For freezing, the alginate solution is introduced at a temperature of 0° to 4° C. and gel formation is conducted at this temperature. The berries, by preference, are cooled to 0° C. through suitable vacuum prior to the impregnation to thereby insure gel formation at low temperature. The berries remain firm and plump during the subsequent handling operations and are not subject to leakage of fluids at any time.

*Example 2*

For preparation of a product with a shorter gelation time than given in Example 1, a batch of berries is subjected to the same cyclic dehydration operation to remove about 10 to about 20% of the water, as previously described, and then after the valve to the source of vacuum has been closed but while the product is still under vacuum, a solution of a soluble calcium salt is run into the dehydrating chamber in sufficient quantity to completely immerse the berries. This solution may, for example, contain from about 0.05 to about 0.2% calcium chloride, or about three times as much by weight of calcium lactate. After a short period of impregnation, i.e., one or two minutes, the calcium solution is drawn off, the valve to the vacuum source is opened and cyclic dehydration is repeated until about 10 to about 20% of moisture is again removed from the berries. At this point, the valve to the vacuum source is again closed and a sodium alginate solution of one percent concentration (containing sugar, if desired), is run into the dehydrating chamber so as to immerse the berries. Again, after a short period for absorption, the alginate solution is withdrawn for further use and the berries may then be removed from the dehydration chamber. An alginate gel is formed almost immediately in situ within the berries, due to the presence of soluble calcium salt therein, which acts upon the alginate solution incorporated by the second impregnation step. In this operation, the calcium solution is utilized at a temperature of, for example, 80° to 100° F. so as to maintain the berries in heated condition for the second dehydration operation. The alginate solution, on the other hand, may be used at a much lower temperature. Further, if the berries are to be frozen following the impregnation operations, the berries may be chilled to approximate freezing temperature and alginate solution at a temperature of about 0° to 4° C. is utilized for the second impregnating step. The berries so impregnated are then immediately frozen while still at the low temperature. Gels thus formed in situ within the berries at freezing temperatures are not destroyed by subsequent freezing and thawing action, so that the berries do not become mushy after thawing and do not tend to leak their juices.

*Example 3*

100 pounds of cherries, strawberries, raspberries, or the like, are subjected to a cyclic vacuum dehydration operation at a temperature between about 100° and 120° F. in the manner previously described, until about 10 to about 20% of the moisture has been removed. The valve between the dehydration chamber and the source of vacuum is then closed, and a 2% solution of methyl cellulose of low or medium viscosity, at a temperature of about 80° F. is introduced within the dehydrating chamber in sufficient quantity to immerse the berries. If desired, sugar and flavoring may be included in such solution. After a short absorption period, i.e., less than about 2 minutes, the impregnating solution is withdrawn for re-use and the dehydrating chamber is again connected to the source of vacuum. Dehydration is continued in the cyclic manner until about 10 to about 20% of moisture is again removed. At this point, the valve to the source of vacuum is again closed and the dehydrated products are again immersed in the methyl cellulose solution. This cyclic operation can be repeated as many times as desired to build up the concentration of methyl cellulose, sugars, and the like, within the product. The berries are then removed and are frozen, canned, or otherwise preserved or stored for use. For example, they may be placed in the commercial size, 30-pound cans for use by the pie-making industry. The viscosity of the methyl cellulose solution within the berries facilitates their remaining in their original shape. Further, when such berries are cooked, as in a pie or the like, the methyl cellulose solution forms a gel so as to prevent leakage of juices from the berries. This gel liquifies on cooling so that the end product has a juicy taste characteristic.

*Example 4*

A batch of cherries, strawberries, raspberries, or the like, is dehydrated by the cyclic vacuum process at a temperature of from about 100° to 120° F. in the manner described above, until about 10 to about 20% of the moisture is removed, and the valve to the source of vacuum is closed. A solution containing about one percent sodium alginate, 0.12% calcium carbonate, and two percent methyl cellulose is then run into the dehydrating chamber in a sufficient amount to immerse the food product. The alginate and methyl cellulose solutions are separately made up and are mixed just prior to the impregnating operation. After a short period for absorption, the solution is withdrawn and the impregnated product—in which gel formation is now initiated by the action of the fruit acids upon the calcium carbonate to release calcium ions, which, in turn, act upon the alginate to form an alginate gel—is processed by freezing, canning, or other conventional means. In this product, the methyl cellulose tends to retain water in small globules in relatively liquid form within the alginate gel, thereby enhancing the taste and texture of the product.

*Example 5*

The process of Example 4 is repeated, except that after the first dehydration operation, the fruit is immersed in a 2% methyl cellulose solution at a temperature of 70° to 90° F., following which a second dehydrating operation is conducted to again remove about 10 to about 20% of the moisture. The alginate solution containing 1% sodium alginate and 0.12% calcium carbonate is then utilized as a second impregnating fluid, resulting in a soft alginate gel structure, thereby providing a desirable taste characteristic. Moreover, upon cooking this product, as in pies and the like, the methyl cellulose forms a gel due to increase in temperature, and facilitates the retention of liquids within the product during the cooking operation as well as maintaining the shape thereof.

*Example 6*

A batch of berries, cherries, or the like, is subjected to dehydration in a cyclic vacuum process as described above, until about 10 to about 20% of the moisture has been removed. The valve to the source of vacuum is then closed and the berries are impregnated by immersion in a solution of potassium bitartrate having a concentration of about 0.3 to about 0.4 gram per 100 grams of water. The impregnating liquid is then drawn off and the source of vacuum is again connected. The products are again dehydrated until about 10 to about 20% of the moisture is again removed. Such dehydration results in a concentration of the potassium bitartrate within the fruit, so that it is at least partially precipitated. After the dehydration, the valve to the source of vacuum is closed, and the fruit is now immersed in a cold 1% solution of sodium alginate also containing from about 0.15 to about 0.20% tricalcium phosphate. This results in substantially immediate formation of a soft gel in the product and in the formation of a harder gel when the product is eventually cooked. Thus, the insoluble bitartrate becomes more than ten times as soluble at cooking temperatures than at room temperature or below, and is released during the cooking operation to further solubilize some of the tricalcium phosphate which does not initially go into solution. The solution is drawn off and the product frozen or otherwise preserved.

In any of the foregoing examples, it will be understood that sugar, vitamins, antioxidants, flavoring, etc., may be incorporated in the various solutions employed. Further, it will be readily perceived that gel formation with the alginate solutions may be conducted either at freezing temperatures, so as to provide a product which will resist freezing and thawing, or at higher temperatures, where the product is to be immediately used or preserved by canning.

*Example 7*

A batch of strawberries is subjected to cyclic vacuum dehydration in the manner described above, until about 10 to about 20% moisture is removed, and the valve to the source of vacuum is then closed. The berries are then immersed in a 5% sugar solution, containing 0.5% methyl cellulose of relatively low viscosity, which has been maintained at a temperature of about 100° F. After an absorption period of about one minute, the sugar solution is withdrawn, the valve to the source of vacuum is again opened, cyclic dehydration is conducted until about 10 to about 20% of the moisture is again removed. The impregnation process with the methyl cellulose-sugar solution is again repeated. This alternate operation is continued until the percentage of sugar and methyl cellulose solution within the berries has reached a desired level. The solution is then withdrawn and the berries are subjected to a freezing operation.

The described method of impregnation by immersion process has been given as an example. Any other method of impregnation such as, for example, by spraying could be used. It is obvious that other types of vacuum impregnation chambers, such as those utilizing rotating cylinders in place of trays, might be used to carry out the methods disclosed.

I claim:

1. In a process for preserving and improving moisture-containing food products, the steps comprising: partially dehydrating said moisture-containing food products by subjecting them to a series of subatmospheric pressure changes at elevated temperature and between at least some of said pressure changes causing said partially dehydrated products to absorb an edible liquid containing a hydrophilic colloid, said absorption step being repeated a plurality of times alternately between dehydrating steps to build up the concentration of solute in the liquid remaining in the food products.

2. The process of claim 1 wherein said hydrophilic colloid is methyl cellulose and the food product impregnated with methyl cellulose solution is frozen.

3. In a process for preserving fresh fruits by freezing so that the fruit products retain substantially their initial appearance after freezing and thawing, the steps comprising: subjecting said fresh fruits to partial dehydration by a series of subatmospheric pressure changes and then at substantially freezing temperatures and while vacuum conditions still exist in said fruit immersing said partially dehydrated fruit in an aqueous liquid containing a water-soluble alginate and a relatively insoluble alkaline earth metal compound capable of releasing calcium ions under the influence of natural acids within the fruit, so that said liquid is absorbed by said fruit, permitting said gel-forming solution to gel within the fruit at substantially freezing temperature, then freezing said products containing said gel.

4. The process of claim 3 wherein the liquid also contains methyl cellulose.

5. A process for treating moisture-containing food products comprising subjecting said food products to partial dehydration by a series of subatmospheric pressure changes, then while vacuum conditions still exist within the food products, immersing them in a solution containing a soluble calcium salt, withdrawing any solution not absorbed, repeating said partial dehydration by a series of subatmospheric pressure changes, and again while vacuum conditions still exist in said food product, immersing said food product in a solution containing a water-soluble alginate whereby gel formation takes place in situ within the food product by reaction of calcium ions on said alginate, and withdrawing excess alginate solution.

6. A process for treating fresh fruits to preserve their natural characteristics, comprising: partially dehydrating said fruits by subjecting them to a series of subatmospheric pressure changes, then, while vacuum conditions still exist within said fruits, immersing them in a solution of methyl cellulose, withdrawing any solution not absorbed, again dehydrating said fruits by subjecting them to a series of subatmospheric pressure changes, then while the vacuum conditions still exist within the fruit, immersing it in a solution of a water-soluble alginate containing a relatively slowly soluble calcium salt capable of reaction with the natural acids in the fruit to release calcium ions, whereby gel formation takes place within the fruit due to the action of the calcium ions on the alginate, and withdrawing any excess alginate solution.

References Cited in the file of this patent

UNITED STATES PATENTS

| | | |
|---|---|---|
| 666,413 | Dunnachie | Jan. 22, 1901 |
| 1,890,475 | Todd | Dec. 13, 1932 |
| 2,702,248 | Guadagni | Feb. 15, 1955 |
| 2,709,857 | Rivoche | June 7, 1955 |
| 2,785,075 | Malecki | Mar. 12, 1957 |
| 2,788,281 | Guadagni | Apr. 9, 1957 |
| 2,791,508 | Rivoche | May 7, 1957 |
| 2,801,925 | Fisher | Aug. 6, 1957 |
| 2,824,810 | Guadagni | Feb. 25, 1958 |